United States Patent [19]
Teich et al.

[11] Patent Number: 5,943,493
[45] Date of Patent: Aug. 24, 1999

[54] RETARGETABLE VLIW COMPUTER ARCHITECTURE AND METHOD OF EXECUTING A PROGRAM CORRESPONDING TO THE ARCHITECTURE

[75] Inventors: Paul R. Teich; Saf Asghar, both of Austin, Tex.; Sherman Lee, Rancho Palos Verdes, Calif.

[73] Assignee: Advanced Micro Devices Inc., Sunnyvale, Calif.

[21] Appl. No.: 08/915,679

[22] Filed: Aug. 21, 1997

[51] Int. Cl.$^6$ .............................. G06F 9/34; G06F 12/12
[52] U.S. Cl. ..................... 395/569; 395/571; 395/826; 711/217
[58] Field of Search ................................ 395/842, 394, 395/309, 385, 182.03, 571, 311, 569, 826, 214; 711/203, 206; 364/DIG. 1, DIG. 2

[56] References Cited

U.S. PATENT DOCUMENTS

| | | | |
|---|---|---|---|
| 5,327,551 | 7/1994 | Kameko | 395/182.03 |
| 5,392,406 | 2/1995 | Peterson et al. | 395/311 |
| 5,509,131 | 4/1996 | Smith et al. | 711/206 |
| 5,696,925 | 12/1997 | Koh | 711/203 |

*Primary Examiner*—Daniel H. Pan
*Attorney, Agent, or Firm*—Foley & Lardner

[57] ABSTRACT

A method of executing a program includes reading a next operation of an executing program and determining if a given pointer corresponding to the next operation is stored in a pointer table. If the given pointer is stored in the pointer table, an instruction identified by the given pointer is executed in a processor. However, if the given pointer is not stored in the pointer table, a replaceable pointer in the pointer table is identified and replaced by the given pointer. Instructions corresponding to the given pointer are also imported into a processor instruction unit from a supplemental storage area and subsequently executed by the processor. The instructions can comprise microcode or a portion of a programmable gate array. In the latter case, the supplemental storage area can store gate array programming instructions for use in reprogramming the instructions in the processor. When replacing a pointer in the pointer table, a least recently used algorithm or a most recently used algorithm are provided as examples of methods for defining the replaceable pointer. A retargetable VLIW computer architecture for carrying out this method includes a program execution unit, a pointer table, a processor, a processor instruction unit, and a supplemental storage area. The architecture further includes interconnections between the aforementioned elements for updating the pointer table to replace a replaceable pointer with a given pointer and for replacing one or more instructions corresponding to the replaceable pointer with one or more instructions corresponding to the given pointer.

12 Claims, 5 Drawing Sheets

RETARGETABLE VLIW COMPUTER ARCHITECTURE AND METHOD OF EXECUTING A PROGRAM CORRESPONDING TO THE ARCHITECTURE

BACKGROUND OF THE INVENTION

A very long instruction word (VLIW) is a single computer instruction which causes the execution of multiple tasks within a single cycle. The invention provides an improved architecture for processing a sequence of VLIW instructions.

SUMMARY OF THE INVENTION

In one embodiment according to the invention, a VLIW computer architecture includes a program execution unit, a pointer table connected to the program execution unit, a processor instruction unit, a processor connected to the pointer table, the processor instruction unit and the program execution unit, a supplemental storage area and means for updating the pointer table and the processor with contents of the supplemental storage area. According to this embodiment, the processor instruction unit contains an instruction corresponding to each pointer in the pointer table. The supplemental storage area, on the other hand, contains additional instructions which correspond to pointers that are not in the pointer table. The pointer table is updated to replace a replaceable pointer with a given pointer corresponding to a next operation when the program execution unit reads the next operation and determines that the given pointer is not in the pointer table. Similarly, the processor instruction unit is updated to replace one or more instructions corresponding to the replaceable pointer with one or more instructions from the supplemental storage area which correspond to the given pointer. Preferably, the processor instruction unit is updated at about the same time as the pointer table is updated.

In one example of this embodiment, each instruction in the processor instruction unit can include microcode, such that the processor instruction unit is updated by replacing microcode of the one or more instructions corresponding to the replaceable pointer with microcode of one or more instructions corresponding to the given pointer. Thus, the means for updating the processor instruction unit identifies the microcode of instructions corresponding to the given pointer in the supplemental storage area and writes this microcode to memory locations which had contained microcode of instructions corresponding to the replaceable pointer. Thus, the memory locations transition from containing microcode corresponding to the replaceable pointer to containing microcode corresponding to the given pointer.

In another example of this embodiment, each instruction in the processor instruction unit includes a portion of a programmable gate array, such that the processor instruction unit is updated by reprogramming a portion of the programmable gate array corresponding to the replaceable pointer to correspond to the given pointer. In this example, means for updating the processor instruction unit can include gate array programming logic which reads gate array programming instructions from, for example, the supplemental storage area, and reprograms the portion of the programmable gate array corresponding to the replaceable pointer according to the gate array programming instructions.

The replaceable pointer can be identified, for example, as a pointer corresponding to an operation which was least recently executed. Alternatively, for example, the replaceable pointer can be identified as a pointer corresponding to an operation which was most recently executed.

In another embodiment according to the invention, a method of executing a program includes the steps of reading a next operation of an executing program, determining if a given pointer corresponding to code contained in the next operation is stored in a pointer table, and executing in a processor an instruction from a processor instruction unit identified by the given pointer if the given pointer is stored in the pointer table. Alternatively, if the given pointer is not stored in the pointer table, a replaceable pointer within the plurality of pointers in the pointer table is identified and replaced by the given pointer. Further, an instruction in the processor instruction unit corresponding to the replaceable pointer is replaced by an instruction corresponding to the given pointer. The instruction corresponding to the given pointer can be retrieved, for example, from a supplemental storage area. The instruction corresponding to the given pointer is then executed by the processor. The processor can then reinitiate the method by reading a next operation of the executing program and acting accordingly.

In one example of this embodiment, each instruction in the processor instruction unit includes microcode such that the step of replacing an instruction in the processor instruction unit includes replacing microcode of the instruction corresponding to the replaceable pointer with microcode of the instruction corresponding to the given pointer.

In another example, each instruction in the processor instruction unit includes a portion of a programmable gate array, such that the step of replacing an instruction in the processor instruction unit corresponding to the replaceable pointer with an instruction corresponding to the given pointer includes reprogramming a portion of the programmable gate array that corresponds to the replaceable pointer to correspond to the given pointer. This reprogramming can be accomplished according to gate array programming instructions contained, for example, in the supplemental storage area.

The step of identifying a replaceable pointer can include determining which of the plurality of pointers in the pointer table corresponds to an operation which was least recently executed and identifying this pointer as the replaceable pointer. Alternatively, the step of identifying a replaceable pointer in the plurality of pointers in the pointer table can include determining which of the plurality of pointers corresponds to an operation which was most recently executed and identifying this pointer as the replaceable pointer.

BRIEF DESCRIPTION OF THE DRAWINGS

These and other objects and advantages of the invention will be apparent from a review of the specification in view of the drawings, wherein.

DETAILED DESCRIPTION

Figure 1:
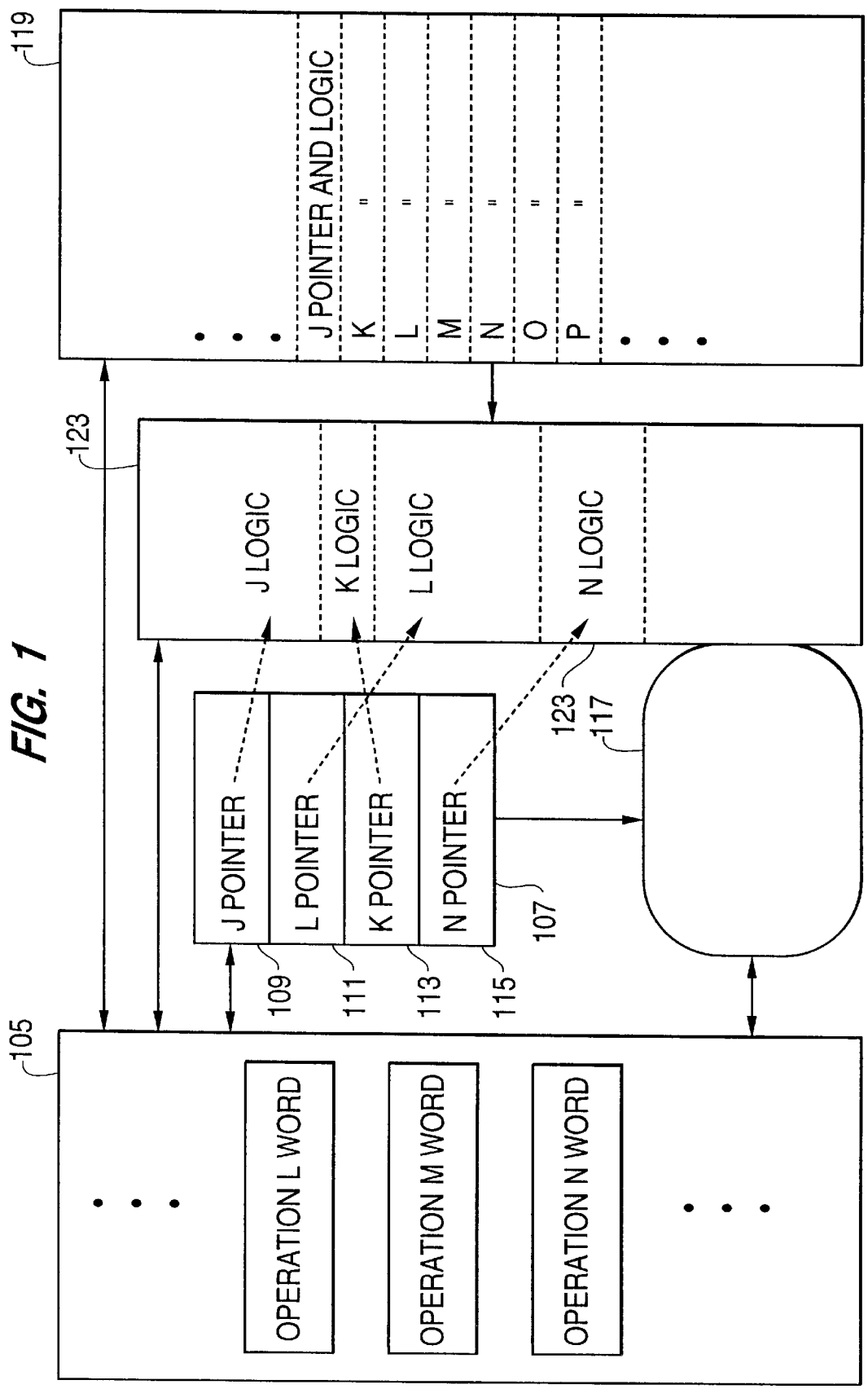
FIG. 1 is a block diagram of a first embodiment according to the invention.

FIG. 1 shows a block diagram of one embodiment according to the invention. As shown in FIG. 1, program execution unit 105 is connected to pointer table 107. Pointer table 107 contains, for example, four pointer cells 109, 111, 113, and 115. Four pointer cells are shown in pointer table 107 merely for purposes of illustration and not by way of limitation. Pointer table 107 can include any quantity of pointer cells and fall within the scope of the invention.

In operation, program execution unit 105 executes VLIW instructions, referred to herein as "operations." After completing a first operation, program execution unit 105 proceeds to the next operation of an executing program in order to execute the next operation. In the example shown in FIG. 1, program execution unit 105 recently completed operation L, and is currently executing operation M. Subsequently, program execution unit 105 will execute operation N.

While executing operation M, program execution unit 105 reads the VLIW code contained in operation M and searches cells 109–115 of pointer table 107 to determine if a given pointer corresponding to the code of operation M is stored within pointer table 107. If a pointer is resident within pointer table 107, processor 117 executes one or more instructions from processor instruction unit 123 corresponding to the given pointer. After processor 117 executes these instructions, it informs program execution unit 105 of this status, enabling program execution unit 105 to advance to operation N.

If, on the other hand, the given pointer corresponding to the code of operation M is not found in pointer table 107 by program execution unit 105, then pointer table 107 will be updated to include the given pointer. In one example, when program execution unit 105 determines that pointer table 107 does not contain the given pointer, program execution unit 105 looks in supplemental storage area 119. When program execution unit 105 finds the pointer in the supplemental storage area 119, program execution unit 105 subsequently writes the given pointer into one of the pointer cells 109–115 of pointer table 107. Supplemental storage area 119 will also replace one or more instructions in processor instruction unit 123 with one or more instructions from supplemental storage area 119 which correspond to the given pointer which is written into pointer table 107.

Figure 2:
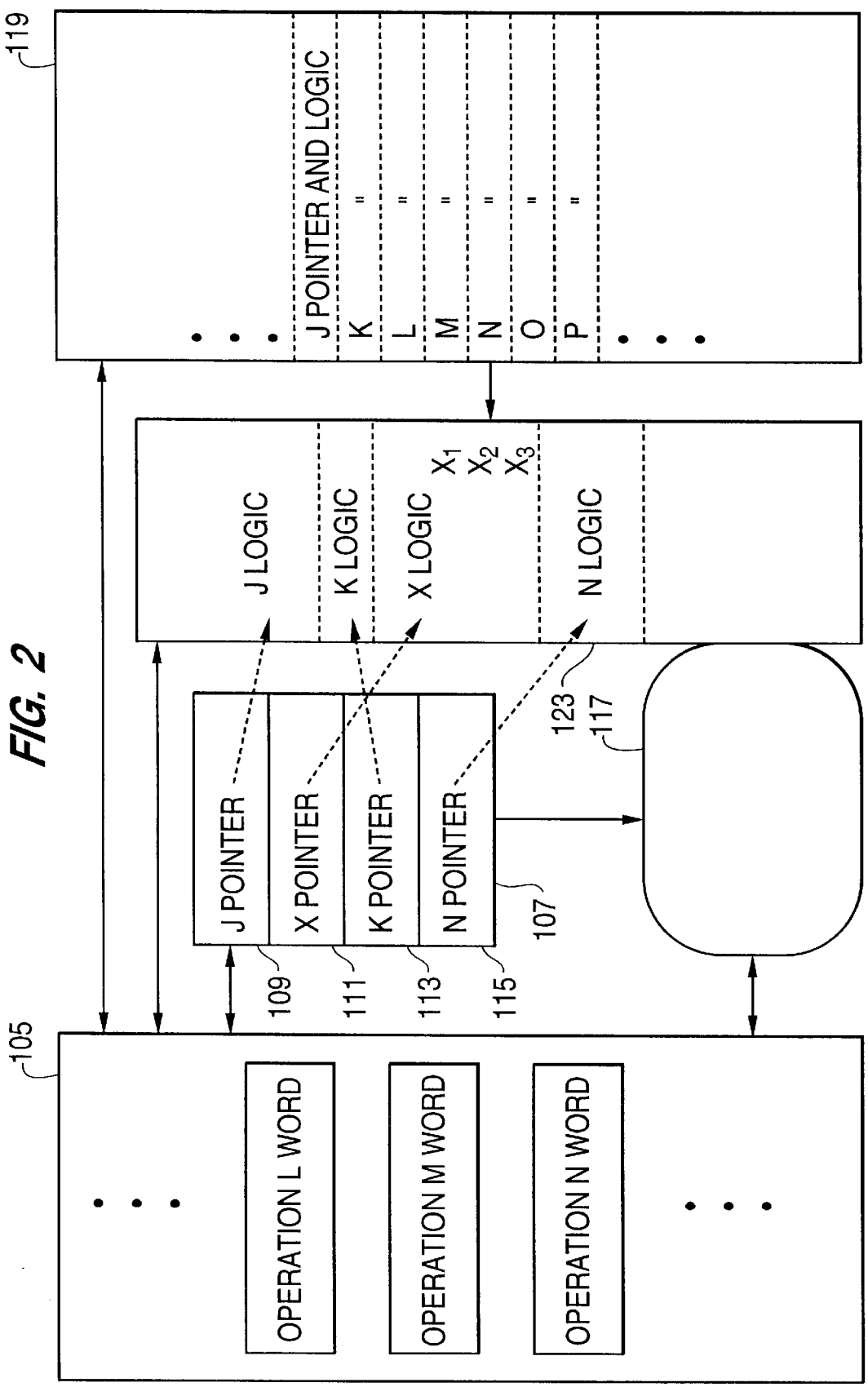
FIGS. 2–4 show the operation of the embodiment of FIG. 1.

FIG. 2 shows an example of an embodiment wherein each of the instructions in the processor or in the supplemental storage area comprises microcode. Replacing an instruction in processor instruction unit 123 thus requires the writing of microcode from supplemental storage area 119 into a specific location within processor instruction unit 123.

For example, presume that program execution unit 105 commences execution of operation M. Program execution unit 105 analyzes operation M and searches pointer table 107 to determine if a given pointer corresponding to code contained within operation M is present in pointer table 107. It is, of course, possible that multiple pointers will each correspond to sections of code within operation M, in which case, program execution unit 105 searches pointer table 107 for each of the pointers corresponding to code contained in operation M. For purposes of simplicity, however, this embodiment according to the invention will be described with respect to a single given pointer. This description is purely by way of example and not of limitation.

Presume, for example, that program execution unit 105 searches pointer table 107 for pointer X, which corresponds to code contained within operation M. As shown in FIG. 2, if pointer X is found in pointer table 107, for example, in pointer cell 111, then processor 117 executes one or more instructions, such as, for example, instructions $X_1$, $X_2$ and $X_3$ which are stored within processor instruction unit 123 and pointed to by pointer X.

One method for initiating execution of instructions $X_1$, $X_2$ and $X_3$ is for pointer table 107 to send a signal to processor 117 indicating that program execution unit 105 has identified pointer X as corresponding to code within operation M. In response to the signal, processor 117 executes the instructions corresponding to pointer X. Alternatively, when program execution unit 105 identifies pointer X contained within pointer cell 111, program execution unit 105 can read information corresponding to pointer X from pointer cell 111 and, based on this information, send corresponding signals to processor 117 to cause the execution of instruction of $X_1$–$X_3$. In any event, when program execution unit 105 determines that pointer X is present within pointer table 107, it thus knows that the instructions corresponding to pointer X are present in processor instruction unit 123 and available for immediate execution.

Figure 3:
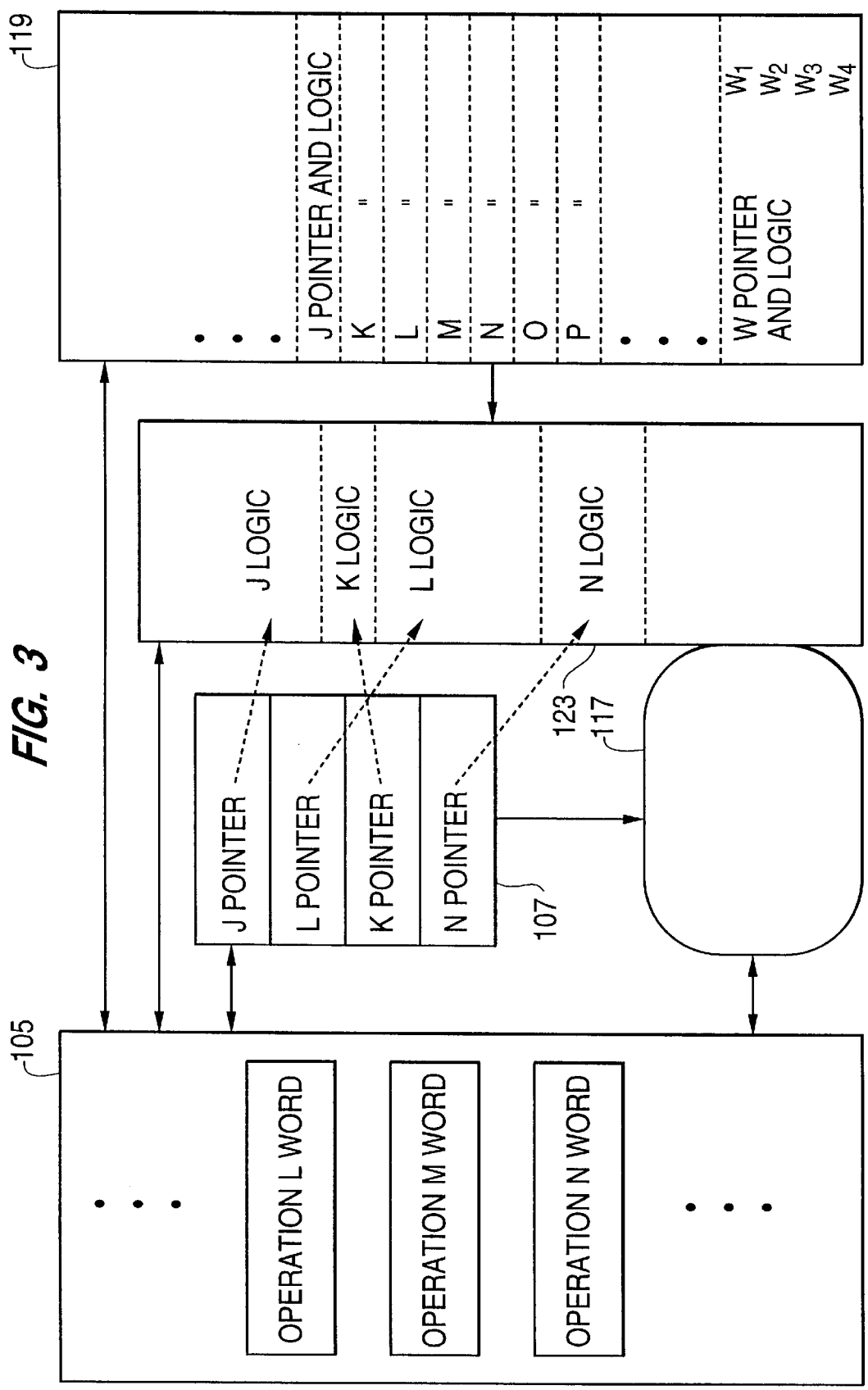

In the example shown in FIG. 3, the given pointer is not present within pointer table 107 when searched for by program execution unit 105. For example, if program execution unit 105 completes operation M and begins to execute operation N, it will search pointer table 107 for pointers corresponding to code within operation N. For example, presume program execution unit 105 searches pointer table 107 for pointer W. As can be seen in FIG. 3, pointer table 107 contains pointers J, L, K, and N. Thus, pointer W is not present in pointer table 107. If pointer table 107 is not full, pointer W can be directly added to pointer table 107. If, however, pointer table 107 is full, one of the pointers J, L, K, and N may be identified as a replaceable pointer to be replaced with pointer W, which can be, for example, imported from supplemental storage area 119. Similarly, instructions $W_1$–$W_4$, which correspond to pointer W, will be imported into processor instruction unit 123 from supplemental storage area 119. If processor instruction unit 123 lacks sufficient storage to hold the corresponding instructions, one or more of the remaining pointers may be removed from pointer table 107 in conjunction with removing the instructions corresponding to the removed pointer(s) from processor instruction unit 123.

Figure 4:
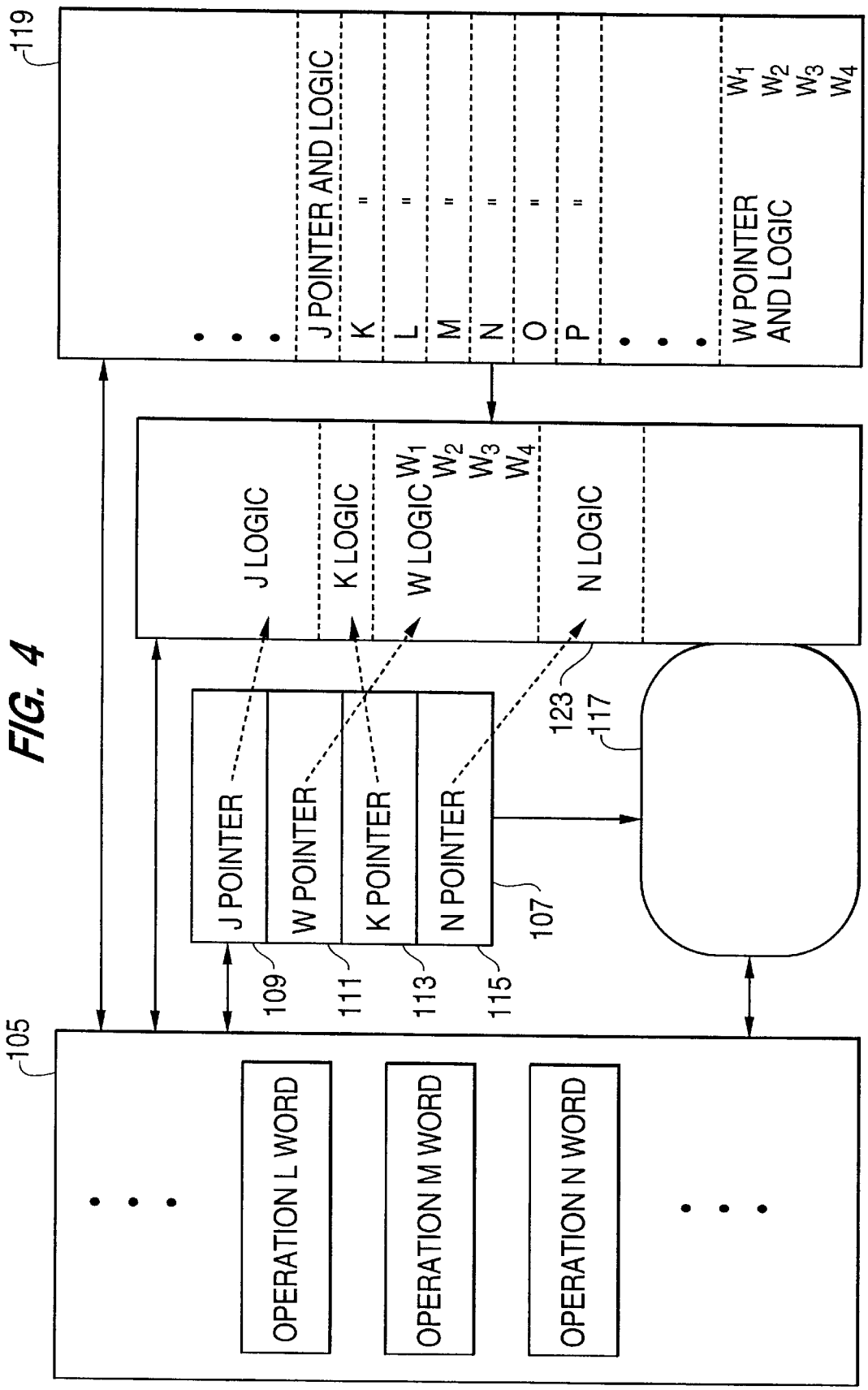

As an example of replacing a pointer in pointer table 107, suppose pointer L is identified as the replaceable pointer within pointer table 107 by, for example, a least recently used algorithm which determines that pointer L is the pointer within pointer table 107 which was least recently used. As shown in FIG. 4, pointer W is imported into pointer table 107 and replaces pointer L within pointer cell 111. Pointer L remains present in supplemental storage area 119. Also, as pointer W is imported into pointer table 107, instructions $W_1$–$W_4$ are imported into processor instruction unit 123 and are thus available for execution.

As described above, a least recently used algorithm can be employed to determine which of the pointers in pointer table 107 should be replaced by the given pointer. This is purely by way of example and not by way of limitation. Other methods of identifying a replaceable pointer can be employed. For example, in certain cyclical operations, it may be more efficient to employ a most recently used algorithm. Thus, in the example discussed above, where pointer W must be imported to replace a pointer in pointer table 107 during execution of operation N, pointer K located in pointer cell 113 could be identified as the most recently used pointer and pointer W would replace pointer K in pointer table 107.

Figure 5:
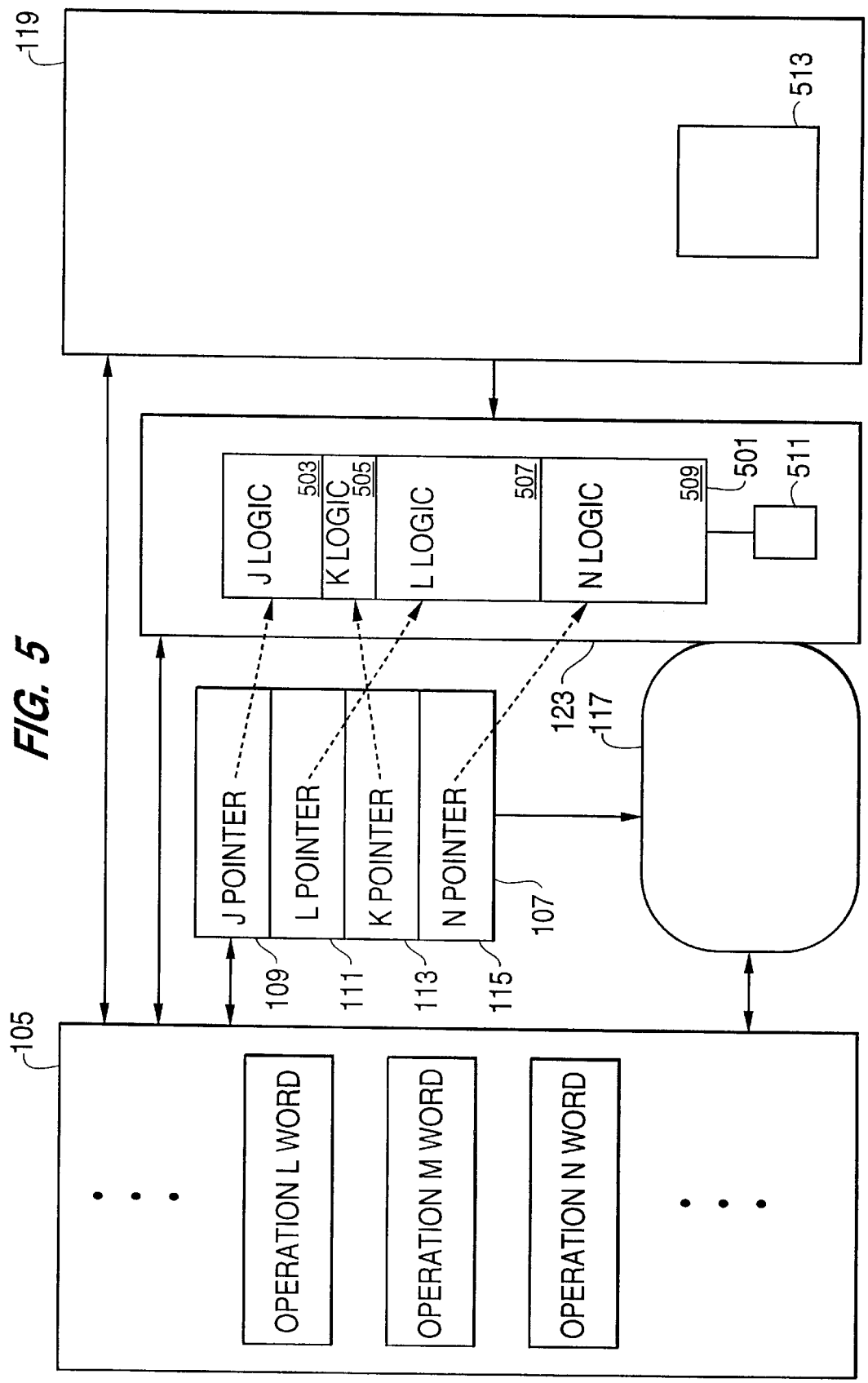
FIG. 5 is a block diagram of a second embodiment according to the invention.

FIG. 5 shows an alternative embodiment according to the invention wherein processor instruction unit 123 includes programmable gate array 501. Programmable gate array 501 is divided, for example, into portions 503, 505, 507 and 509. Processor instruction unit 123 also includes gate array programming unit 511 which is connected to programmable gate array 501 and is coupled to programming instruction store 513 of supplemental storage area 119.

According to the embodiment of FIG. 5, when program execution unit 105 searches pointer table 107 and identifies a given pointer therein, the given pointer points to a corresponding portion of programmable gate array 501 which is configured according to instructions corresponding to the given pointer. As with the embodiment shown in FIGS. 2–4, the presence of a given pointer within pointer table 107 is indicative of one or more corresponding instructions being present in processor instruction unit 123 and available for execution.

If, however, the given pointer is not within pointer table 107, the given pointer can be read into pointer table 107 in a manner similar to that described in the embodiment of FIGS. 2–4. However, in this embodiment, instead of importing microcode into processor instruction unit 123 in parallel with the importation of the given pointer into pointer table 107, programming instructions from program instruction store 513 are imported into gate array programming unit 511 for use in reprogramming a portion of programmable gate array 501.

For example, presume the given pointer is not present in pointer table 107 and that pointer cell 111 has been identified as the cell into which the given pointer is to be imported. If portion 507 of gate array 501 corresponds to pointer cell 111, and the given pointer is imported into pointer cell 111 from supplemental storage area 119, then programming instructions are imported into gate array programming unit 511 from program instruction store 513 to enable gate array programming unit 511 to reprogram portion 507 to represent the instructions corresponding to the given pointer which is imported into pointer cell 111. Gate array programming unit 511 thus reprograms portion 507 of programmable gate array 501 and the thus programmed instructions are executed.

While several embodiments according to the invention have been described, it will be understood that these are capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of executing a program, comprising the steps of:
   a) reading a next operation of an executing program;
   b) determining if a given pointer corresponding to code contained in the next operation is stored in a pointer table;
   c) executing, in a processor, an instruction from a processor instruction unit identified by the given pointer if the given pointer is stored in the pointer table, and returning to step a) after executing the instruction identified by the given pointer;
   d) identifying a replaceable pointer in a plurality of pointers in the pointer table if the given pointer is not stored in the pointer table;
   e) replacing the replaceable pointer by the given pointer in the pointer table;
   f) replacing, from a supplemental storage area, an instruction in the processor instruction unit corresponding to the replaceable pointer with an instruction corresponding to the given pointer; and
   g) executing, in the processor, the instruction corresponding to the given pointer and returning to step a) after executing the instruction.

2. A method as recited in claim 1, wherein each instruction in the processor instruction unit comprises microcode, such that step f) comprises replacing microcode of the instruction corresponding to the replaceable pointer with microcode of the instruction corresponding to the given pointer.

3. A method as recited in claim 1, wherein each instruction in the processor instruction unit comprises a portion of a programmable gate array, such that step f) comprises reprogramming a portion of the programmable gate array corresponding to the replaceable pointer to correspond to the given pointer.

4. A method as recited in claim 3, wherein the portion of the programmable gate array corresponding to the replaceable pointer is reprogrammed according to gate array programming instructions contained in the supplemental storage area.

5. A method as recited in claim 1, wherein step d) comprises determining which of the plurality of pointers corresponds to an operation which was least recently executed, said determined pointer being identified as the replaceable pointer.

6. A method as recited in claim 1, wherein step d) comprises determining which of the plurality of pointers corresponds to an operation which was most recently executed, said determined pointer being identified as the replaceable pointer.

7. A retargetable VLIW computer architecture, comprising:
   a program execution unit;
   a pointer table connected to the program execution unit;
   a processor instruction unit containing an instruction corresponding to each pointer in the pointer table;
   a processor connected to the pointer table, the processor instruction unit, and the program execution unit;
   a supplemental storage area containing instructions corresponding to pointers that are not in the pointer table;
   means for updating the pointer table to replace a replaceable pointer with a given pointer corresponding to a next operation when the program execution unit reads the next operation and determines that the given pointer is not in the pointer table; and
   means for updating the processor instruction unit to replace the instruction corresponding to the replaceable pointer with an instruction from the supplemental storage area corresponding to the given pointer when the means for updating the pointer table replaces the replaceable pointer with the given pointer.

8. A retargetable VLIW computer architecture as recited in claim 7, wherein each instruction in the processor instruction unit comprises microcode, such that the means for updating the processor instruction unit replaces microcode of the instruction corresponding to the replaceable pointer with microcode of the instruction from the supplemental storage area corresponding to the given pointer.

9. A retargetable VLIW computer architecture as recited in claim 7, wherein each instruction in the processor comprises a portion of a programmable gate array, such that the means for updating the processor reprograms a portion of the programmable gate array corresponding to the replaceable pointer to correspond to the given pointer.

10. A retargetable VLIW computer architecture as recited in claim 9, wherein the portion of the programmable gate array corresponding to the replaceable pointer is reprogrammed according to gate array programming instructions contained in the supplemental storage area.

11. A retargetable VLIW computer architecture as recited in claim 7, further comprising means for identifying the replaceable pointer as a pointer corresponding to an operation which was least recently executed.

12. A retargetable VLIW computer architecture as recited in claim 7, further comprising means for identifying the replaceable pointer as a pointer corresponding to an operation which was most recently executed.

\* \* \* \* \*